(12) United States Patent
Chi et al.

(10) Patent No.: US 7,625,503 B2
(45) Date of Patent: *Dec. 1, 2009

(54) RARE-EARTH DOPED FLUORIDES AND PROCESS FOR PREPARING

(75) Inventors: Changzai Chi, Hockessin, DE (US); Michael Karl Crawford, Glen Mills, PA (US); Kurt Richard Mikeska, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 259 days.

This patent is subject to a terminal disclaimer.

(21) Appl. No.: 11/749,771

(22) Filed: May 17, 2007

(65) Prior Publication Data

US 2008/0025896 A1   Jan. 31, 2008

Related U.S. Application Data

(60) Provisional application No. 60/834,443, filed on Jul. 31, 2006.

(51) Int. Cl.
C09K 11/61 (2006.01)
(52) U.S. Cl. ............................................. 252/301.4 H
(58) Field of Classification Search ........... 252/301.4 H
See application file for complete search history.

(56) References Cited

U.S. PATENT DOCUMENTS 6,576,155 B1   6/2003   Barbera-Guillem 6,861,012 B2   3/2005   Gardner et al.
2003/0032192 A1   2/2003   Haubold et al.

FOREIGN PATENT DOCUMENTS

EP   1728763 A2   12/2006

OTHER PUBLICATIONS

Faulques et al., Synthesis, Fabrication, and Photoluminescence of CaF2 Doped With Rare Earth Ions, J. Fluor., 1998, vol. 8:283-287.
Dhopte et al., Luminescence in CaF2:Eu, Journal of Luminescence, 1992, vol. 54:95-101.
Gustafson et al., Trace Analysis of Lanthanides by Laser Excitation of Precipitates, Analytical Chemistry, 1979, vol. 51:1762-1774.
Doorn et al., Comparison of Calcium Fluoride and Lanthanum Fluoride as Host Lattices for the Determination of Lanthanides by Selective Excitation of Probe Ion Luminescence, Anal. Chem., 1985, vol. 57:2869-2873.

(Continued)

Primary Examiner—C. Melissa Koslow

(57) ABSTRACT

The invention is directed a composition represented by the chemical formula $Eu_xA_{1-x}F_{2+x-2y}O_y$ wherein A is alkaline earth, $0.002 \leq x \leq 0.20$, and $0 \leq y \leq x$; the composition exhibiting a luminescence spectrum characterized by peaks at 592±2 nm and 627±2 nm, wherein the ratio of the peak intensity at 592±2 nm to that at 627±2 nm is at least 5% larger than the corresponding peak intensity ratio at the same wavelengths of a first corresponding reference composition with the same value of x that has not been exposed to a temperature above 100° C., and wherein said ratio of the peak intensity at 592±2 nm to that at 627±2 nm is at least 5% smaller than the corresponding peak intensity ratio at the same wavelengths of a second corresponding reference composition with the same value of x that has been subject to heating to 900° C. for 6 hours.

11 Claims, 1 Drawing Sheet

OTHER PUBLICATIONS

Bender et al., Synthesis and Fluorescence of Neodymium-Doped Barium Fluoride Nanoparticles. Chem. Mater., 2000, vol. 12:1969-1976.

Wang et al., Synthesis and Luminescence Behavior of Eu3+ -Doped CaF2 Nanoparticles, Solid State Communications, 2005, vol. 133:775-779.

Chaudhary et al., Optical Absorption & Thermoluminescence of Gd- and Sm-Doped CaF2 Single Crystals Irradiated With X-Rays, Indian Journal of Pure & Applied Physics, 1983, vol. 21:627-630.

Cirillo-Penn et al., Laser Spectroscopic Measurement of Point-Defect Dynamics in Eu3+:CaF2, Physical Review B, 1990, vol. 41:799-807.

Hsu et al., Ultraviolet Response of CaF2:Tm Phosphor With Double Temperature Treatment, Radiation Protection Dosimetry, 1993, vol. 47:235-238.

Martin, W. C. et al., Atomic Energy Levels—The Rare-Earth Elements, Apr. 1978, U. S. Department of Commerce, National Bureau of Standards, Washington, DC 20234 Title page; and pp. 204-207, 255-258, and 339-340 attached hereto.

RARE-EARTH DOPED FLUORIDES AND PROCESS FOR PREPARING

FIELD OF THE INVENTION

The present invention is directed to rare-earth doped alkaline earth fluorides having novel luminescence properties, and to a process for preparing them. The invention is useful as an identifying mark on articles. Other uses include phosphors for plasma displays, optical frequency multipliers, optical amplifiers and the like.

BACKGROUND OF THE INVENTION

Luminescent rare-earth doped alkaline-earth fluorides have long been known, and have been employed for numerous purposes such as scintillation detectors and laser materials. $CaF_2$ doped with such rare-earth species as $Eu^{+3}$, $Er^{+3}$, $Tb^{+3}$ are well-known compositions. It is well-known that a rare-earth doped alkaline earth fluoride will exhibit luminescence when exposed to ultraviolet light.

Each rare-earth element when incorporated into an alkaline earth host lattice such as $CaF_2$ exhibits a characteristic excitation spectrum; see, for example, FIG. 1 (101), and a characteristic emission or luminescence spectrum that depends upon the excitation wavelength employed; see, for example, FIG. 1 (102). The excitation spectrum is determined by monitoring the luminescence intensity at one wavelength while the specimen is illuminated over a range of wavelengths. The luminescence spectrum is determined by illuminating the specimen at a single wavelength corresponding to a peak in the excitation spectrum and determining the luminescence spectrum by scanning a detector over a range of wavelengths.

As shown in the FIGURE, each such spectrum consists of a plurality of peaks at different wavelengths of light. The wavelengths at which the peaks occur are characteristic of each rare-earth element. No two rare-earth elements exhibit the same excitation or emission spectra; that is, the peaks in their spectra do not in general arise at the same wavelengths. To obtain luminescence, the rare-earth element must be excited by a light source that emits light at a wavelength corresponding to the location of one of the peaks in the excitation spectrum. In general, the peaks in any one spectrum of rare-earth elements differ from one another in height or intensity, these differences in intensity being characteristic of the rare-earth element under particular conditions of measurement. These and related matters are all well-documented in the art. See for example, Martin et al., *Atomic Energy Levels-the Rare-Earth Elements*, U.S. Department of Commerce, National Bureau of Standards (1978).

It is known in the art that rare-earth-doped alkaline earth fluorides synthesized at temperatures below 100° C. exhibit a characteristic luminescence spectrum. See for example, Faulques et al., J. Fluor. 8 (4), pp. 283-287 (1998), discloses that room-temperature synthesized rare-earth-doped fluorides will undergo changes in luminescence spectrum when heated to high temperatures for sufficiently long durations.

As disclosed in the art, considerable effort is directed towards developing compositions comprising luminescent rare-earth doped fluorides for use as identifying markers on commercial goods, including packages, manufactured articles, and even money. One high value application contemplated is in the area of "security markers" or anti-counterfeiting marks on goods. The idea is to place an identifying mark on a manufactured article which will attest to its authenticity. The mark is ideally invisible until inquiry is made using a particular wavelength of light which then stimulates the rare-earth doped fluoride to luminesce with a characteristic spectrum.

Security marks known in the art generally lack the complexity or encryption which would make them difficult to counterfeit. The present invention provides a family of novel rare-earth-doped alkaline earth fluorides, and a process for preparing them, that are characterized by continuously variable luminescence peak intensity ratios, making it extraordinarily difficult to counterfeit.

SUMMARY OF THE INVENTION

The present invention provides a composition represented by the chemical formula

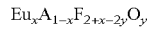

wherein A is alkaline earth, $0.002 \leq x \leq 0.20$, and $0 \leq y \leq x$; the composition exhibiting a luminescence spectrum characterized by peaks at 592±2 nm and 627±2 nm wherein the ratio of the peak intensity at 592±2 nm to that at 627±2 nm is at least 5% larger than the corresponding peak intensity ratio at the same wavelengths of a first corresponding reference composition, with the same value of x, that has not been exposed to a temperature above 100° C., and wherein said ratio of the peak intensity at 592±2 nm to that at 627±2 nm is at least 5% smaller than the corresponding peak intensity ratio at the same wavelengths of a second corresponding reference composition, with the same value of x, that has been subject to heating to 900° C. for 6 hours.

Further provided is a process comprising heating in the presence of oxygen a composition represented by the chemical formula

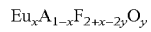

wherein A is alkaline earth, $0.002 \leq x \leq 0.20$, and $0 \leq y \leq x$; initially prepared at a temperature below 100° C., to a maximum temperature in the range of 200° C. to 900° C., followed by cooling, with the proviso that heating not exceed six hours at 900° C., and with the further proviso that the composition so heated has not previously been exposed to the maximum temperature.

DETAILED DESCRIPTION

Figure 1:
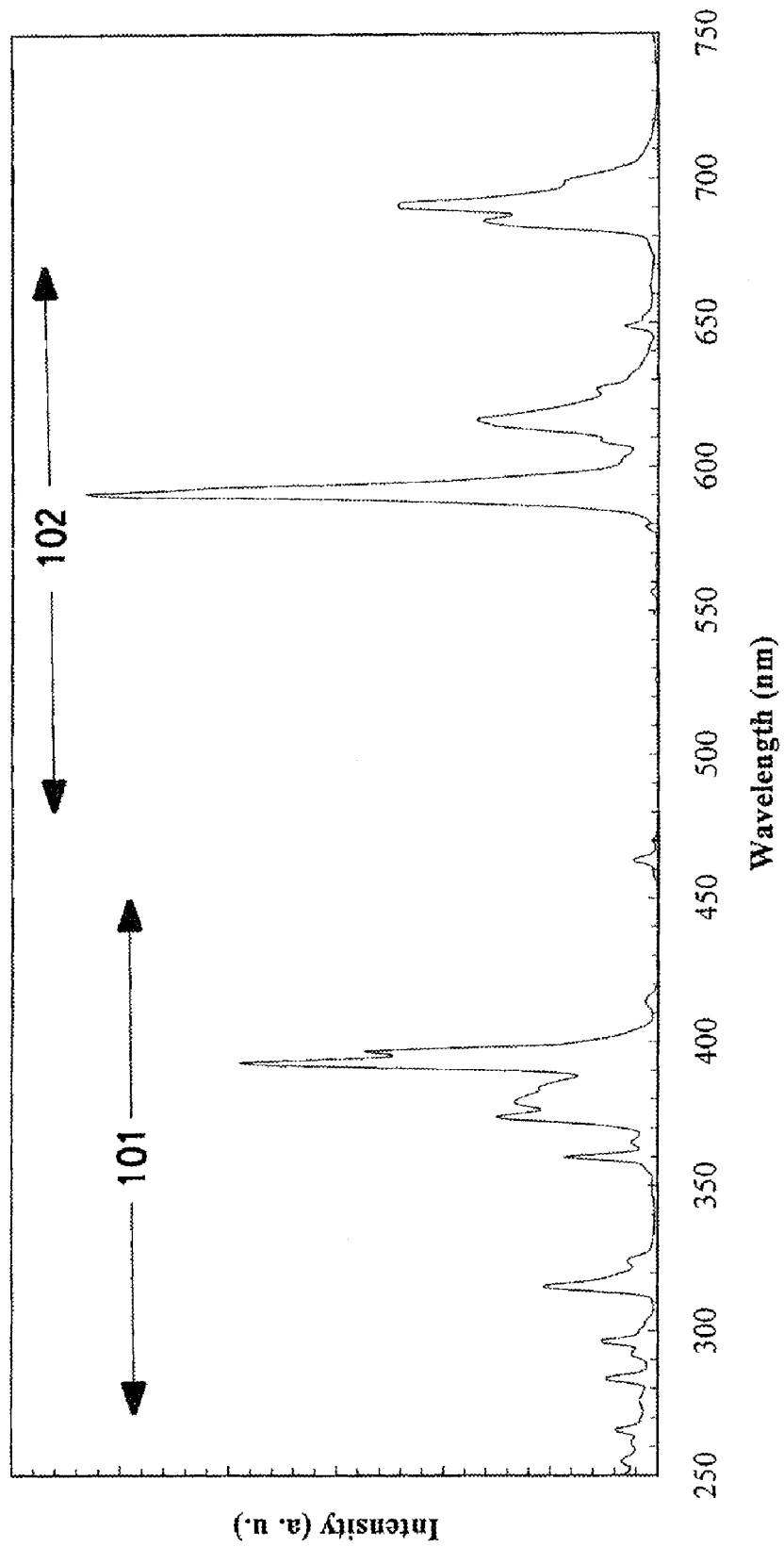
FIG. 1 shows an excitation spectrum of $Eu_{0.05}Ca_{0.95}F_{2.05-2y}O_y$ observed at 592 nm and a luminescence spectrum of $Eu_{0.05}Ca_{0.95}F_{2.05-2y}O_y$ excited at 394 nm.

When a compound represented by the chemical formula

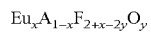

wherein Eu represents a three-valent rare-earth element, A is an alkaline earth, $0.002 \leq x \leq 0.20$, and, $0 \leq y \leq x$ that has been synthesized at a temperature below about 100° C. is heated in the presence of oxygen in the temperature range from 200-900° C., it gives rise to a family of novel rare-earth-doped alkaline earth fluorides that are characterized by changing luminescence peak intensity ratios. One member of each family of compositions is a composition that has been synthesized at a temperature below 100° C. and has not been subject to a temperature above 100° C. This composition is referred to as the first reference composition. A second member of each family of compositions is a composition that has been synthesized at room temperature and heated to 900° C. for a period of at least 6 hours. This composition is referred to as the second reference composition. Each family of compositions is characterized by one particular alkaline earth ion, and one particular value of x.

While not limiting, it is found in the process of the invention, that the first reference compositions are characterized by y/x<0.050 whereas, the compositions prepared according to the process of the invention are characterized by $0.05 \leq y/x \leq 1$. That is, upon heating to a temperature in the range of 200-900° C., the value of y in the reference composition is observed to increase.

Every member of each such family of compositions exhibits a luminescence spectrum having luminescence peaks at 592±2 nm and 627±2 nm, the intensity ratio of which changes depending upon the temperature/time/gas atmosphere profile to which the as-synthesized first reference composition is subject. The term "592/627 peak intensity ratio" shall be employed herein to refer to the ratio of the luminescence peak intensity at 592±2 nm to the luminescence peak intensity at 627±2 nm for a single specimen.

The novel compositions of the present invention are characterized by a 592/627 peak intensity ratio that is at least 5% larger than the 592/627 peak intensity ratio of the first corresponding reference composition. The novel compositions of the present invention are further characterized in that the 592/627 peak intensity ratio is at least 5% smaller than the 592/627 peak intensity ratio of the second corresponding reference composition. All luminescence spectra are determined under the same conditions.

In one embodiment, a compound represented by the chemical formula $$Eu_{0.02}Ca_{0.98}F_{2.02-2y}O_y$$

wherein y/x<0.05 is synthesized at room temperature in a fully aqueous solution described in copending U.S. application Ser. No. 11/443,911 which is incorporated herein by reference to the entirety. The as-synthesized composition is then subject to heating in air to several temperatures between 200 and 900° C. thereby producing the family of compositions wherein $0 \leq y/x \leq 1$.

In another embodiment a compound represented by the chemical formula $$Eu_{0.05}Sr_{0.95}F_{2.05-2y}O_y$$

wherein y/x<0.05 is synthesized at room temperature in aqueous solution as described in copending U.S. application 60/687646. The as-synthesized composition is then subject to heating in air to several temperatures between 200 and 900° C. thereby producing the family of compositions wherein $0 \leq y/x \leq 1$.

Other embodiments include but are not limited to applying the same process to reference compositions such as $Eu_{0.10}Sr_{0.90}F_{2.05-2y}O_y$, $Eu_{0.20}Ca_{0.80}F_{2.20-2y}O_y$, and so forth.

For the purposes of the present invention, a family of compositions is one in which all members contain the $Eu^{+3}$ at the same concentration, x, the same alkaline earth element at the same concentration, 1-x, fluorine and oxygen, and wherein members are usually differentiated from one another by the value of y as well as by the relative peak intensity ratio as defined supra.

Accordingly, a composition is provided represented by the chemical formula $$Eu_xA_{1-x}F_{2x-2y}O_y$$

wherein A is alkaline earth, $0.002 \leq x \leq 0.20$, and $0 \leq y \leq x$; the composition exhibiting a luminescence spectrum characterized by peaks at 592±2 nm and 627±2 nm wherein the ratio of the peak intensity at 592±2 nm to that at 627±2 nm is at least 5% larger than the corresponding peak intensity ratio at the same wavelengths of a first corresponding reference composition, with the same value of x, that has not been exposed to a temperature above 100° C., and wherein said ratio of the peak intensity at 592±2 nm to that at 627±2 nm is at least 5% smaller than the corresponding peak intensity ratio at the same wavelengths of a second corresponding reference composition, with the same value of x, that has been subject to heating to 900° C. for 6 hours.

In one embodiment, A is $Ca^{+2}$. In another embodiment, A is $Sr^{+2}$. In still another embodiment, A is $Ba^{+2}$. In one embodiment of the composition of the invention $0.01 \leq x \leq 0.10$. More specifically, in one embodiment x=0.02. In another embodiment x=0.05. In still another embodiment x=0.10, and in a still further embodiment, x=0.20.

While the process of the invention is directed to the preparation of the compositions by heating the as-synthesized reference composition to a temperature in the range of 200-900° C., with the proviso that the duration of heating not exceed six hours at 900° C., the compositions are not limited to any particular process by which they are prepared. Regardless of how the compositions are prepared, there will always be compositions that meet the limitations of the first and second reference compositions as defined herein.

The preferred alkaline earth metals are calcium, strontium, and barium. $Ca^{+2}$ and $Sr^{+2}$ are preferred.

While in no way limiting upon the invention claimed herein, it is believed that upon heating in the presence of oxygen, an amount of oxygen is incorporated into the crystalline lattice of the composition, up to the amount required to balance the charge of the $Eu^{+3}$ incorporated into the lattice. The exact amount of oxygen present will depend upon the specific composition and the specific conditions of heating. There are no particular requirements regarding the source of oxygen. The process of the invention may be conducted in pure oxygen, in air, or even in nitrogen. Even in a so-called nitrogen atmosphere, it is believed that there is sufficient oxygen contamination either from residual oxygen in the composition itself or in the nitrogen gas to permit the infusion of oxygen into the crystal lattice. It is further believed that the gradual displacement of lattice fluorine by oxygen with more intensive heating is responsible for the observed loss in certain luminescence peaks characteristic of the room-temperature synthesized composition, as described supra.

The first reference compounds are found to generally contain small amounts of oxygen which may arise from a variety of adventitious sources. However, the concentration of oxygen in the first reference compounds is found to be small, with y/x<0.05. The compositions exhibit larger oxygen concentrations than do the corresponding first reference compositions. In the compositions, $0.05 \leq y/x \leq 1.0$. Under some circumstances, it is theoretically possible for y/x>1 because of yet additional, adventitious oxygen present in the lattice but the amount is negligible.

The composition is not limited by the manner in which it is prepared. The present invention further provides a process which is advantageously applied to the preparation of the composition.

The process comprises heating in the presence of oxygen a composition represented by the chemical formula $$Eu_x^{+3}A_{1-x}F_{2+x-2y}O_y$$

where A is alkaline earth, $0.002 \leq x \leq 0.20$, and $0 \leq y \leq x$; to a maximum temperature in the range of 200° C. to 900° C., followed by cooling to ambient temperature, with the proviso that the duration of heating not exceed six hours at 900° C., and with the further proviso that the composition so heated has not previously been exposed to the maximum temperature.

The process of the invention can be performed in a series of heating steps as well as in a single heating step. For example, a specimen synthesized at room temperature can first be heated to, e.g., 300° C., cooled, and at a later time further heated to, e.g., 500° C. The sample heated to 500° C. can then again be cooled and at a later time heated further to a still higher temperature.

Synthesis of the first reference composition may be advantageously accomplished at room temperature but can be conducted up to a temperature of 100° C. Any synthetic method for preparing the first reference composition is suitable so long as the process meets that limitation. Several such processes are known in the art and described in the references cited supra. After drying, the synthesis process results in a powder, or fine particulate, form of the first reference composition.

One suitable process comprises combining an aqueous solution of an ammonium fluoride with an aqueous alkaline earth metal salt solution and an aqueous solution of a $Eu^{+3}$ salt, the amount of $Eu^{+3}$ being in the range of 0.2 to 20 mol-% of the molar concentration of the alkaline earth metal cation content, thereby forming a reaction mixture from which is formed a precipitate of a $Eu^{+3}$-doped alkaline earth fluoride represented by the formula

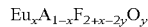

$$Eu_xA_{1-x}F_{2+x-2y}O_y$$

wherein $0.002 \leq x \leq 0.20$, and $0 \leq y \leq 0.2$, and A is $Ca^{+2}$, $Sr^{+2}$, or $Ba^{+2}$, the $Eu^{+3}$ doped alkaline earth fluoride being characterized by an aqueous-solubility of less than 0.1 g/100 g of water.

The reaction in aqueous solution of the soluble fluoride with a soluble alkaline earth salt and $Eu^{+3}$ salt is very rapid. Precipitation occurs so quickly that there is little time for crystal growth after nucleation except in highly dilute solution with low supersaturation.

The particles produced according to the instant process comprise a crystalline or semi-crystalline host material and a dopant. The host material is an alkaline earth fluoride characterized by an aqueous solubility of less than 0.1 g/100 g of water. The dopant is $Eu^{+3}$ which occupies specific lattice sites in the crystalline structure of the host material.

Preferred anions for a soluble alkaline earth metal salt suitable for the process include chloride, nitrate, sulphate, hydroxide, acetate, carbonates, phosphates, bromides, and hydrates thereof.

The aqueous preparation process can be employed to make both nano-scale particles and micro-scale particles, depending upon the reaction conditions. For the purpose of the present invention, the term "nano-scale" shall be understood to refer to a batch of particles of which fewer than 50%, preferably fewer than 90%, of the particles by weight are trapped in a 200 nm filter. It has been found that a 0.2 micrometer Zapcap™-CR chemically resistant bottle top filter available from Schleicher & Schueel Microscience, is satisfactory for this determination.

For the purpose of the present invention, the term "micro-scale" shall be understood to refer to a batch of particles of which at least 50%, preferably at least 90%, of the particles by weight are trapped in a 500 nm filter. Particles said to be micro-sized shall be further characterized in that fewer than 50%, preferably fewer than 90%, of the particles by weight are trapped in a 200 micrometer filter.

Three processes are involved in the precipitation of a solid product from a homogenous reaction solution. (1) chemical reactions that produce supersaturation, (2) nucleation of particles and (3) and growth of particles. For fast reactions, such as occur in the synthesis process described supra, small particles are produced when there is a localized high concentration of the crystallizing species in solution and high supersaturation, which results in high nucleation rates, high nucleated crystal concentrations, and low growth before precipitation. Large particles are produced by reducing the local solution supersaturation, which decreases the nucleation rate and increases the degree of growth occurring before precipitation.

From a processing standpoint, final particle size can be influenced by controlling initial reactant concentrations, crystallizing species concentration (supersaturation) and mixing conditions.

It is observed that increasing the concentration of the rare-earth dopant decreases the size of the particle produced. As a general guideline, preparation of nano-scale particles is beneficially accomplished by employing reactant concentrations of >0.01N, preferably in the range of 0.1N to 0.8N, while preparation of micro-scale particles is beneficially accomplished by employing reactant concentrations of <0.01N. Nano-scale particles may beneficially be prepared by direct mixing of the precursor solutions as in a T-mixer or by some other form of direct mixing. In these cases the local supersaturation is high resulting in high nucleation rates, low growth, and rapid precipitation of nano-scale particles.

While micro-scale particles can also be prepared by direct mixing of highly dilute solutions, it is more convenient to combine about 1N solutions of the reactants in a well-stirred aqueous bath that provides a dilution factor of about 100-200 times—for example, combining 1 liter of 2N alkaline earth chloride, and the appropriate amount of $EuCl_3$, and $NH_4F$ in 120 liters of well-stirred water has been found to be satisfactory for preparing micro-scale particles. It is important to stir the reaction vessel to effectively maintain the reduced local supersaturation.

The process is also applicable to the preparation of nano-scale and micro-scale fluoride salts which are undoped with rare earth. For instance, the process can be used to prepare nano-scale and micro-scale particles of undoped $CaF_2$.

Soluble salt starting materials need only be soluble enough to form aqueous solutions of the desired concentrations for the purposes of the present invention.

For the production of nano-scale particles, it is convenient to combine the reactants in a T-mixer on a continuous or semi-continuous basis. Reaction is essentially instantaneous, with nano-particulate precipitate forming in the output leg of the T as the reaction stream flows into the collector vessel. For production of micro-scale particles, the highly diluted ingredients, with concentrations of <0.01N, may need to be allowed to stand and react while being stirred for about 30 minutes.

The pH of the reaction mixture is preferably maintained close to neutral, but a pH range from about 1 to 11 is acceptable.

Following reaction and product precipitation, the product may be conveniently separated by centrifugation and decanting of the supernatant liquid. The isolated "wet cake" so produced may then be redispersed in water (or organic solvents by a solvent exchange process) by mixing with liquid and subjecting the mixture to ultrasonic agitation for a period of 5-30 minutes. The dispersed particles are then in a form well-suited to use in coatings and the like. For dispersion in non-polar solvents, it may be required to combine the particles produced with surfactants, as taught in the art.

Other suitable methods of separating the precipitate include ion exchange, dialysis and electrodialysis substantially eliminates all salts produced in the process. Further methods, to separate and concentrate the sample, include evaporation of water, centrifugation, ultrafiltration, electrodecantation. A preferred procedure is to employ ion exchange resins to remove soluble salt residues followed by evaporation to concentrate the colloidal sol produced in the process.

It is preferred that the particles so produced be subject to water washing in order to remove any residual water soluble starting materials. Dispersing in water followed by centrifugation is one effective method.

Following preparation of the first reference composition as described supra, preferably at room temperature, the particles are then subject to heating. The particles of the first reference composition are heated to a maximum temperature in the range of 200-900° C. in the presence of oxygen, with the proviso that heating not exceed six hours at 900° C. There is no specific minimum duration of heating except that the duration of heating of a particular composition at a particular temperature must be of sufficient length to cause a change of at least 5% in the peak intensity ratio of at least one pair of peaks in the luminescence spectrum from that of the first reference composition—namely, the as-prepared starting composition.

The particular means employed for heating is not material to the operability of the invention. Suitable means for heating include but are not limited to pressure vessel heating of an aqueous dispersion (so-called hydrothermal heating), electrical resistance furnaces, oil baths, electrically heated crucibles, liquid metal baths; lasers, radio frequency induction furnaces, microwave cavities, gas fired furnaces, oil fired furnaces, solar furnaces. When heated in a bath, the as-synthesized powder is sealed in a pressure vessel of sufficient volume to leave a head-space comprising oxygen followed by immersion of the heated tube into the heating bath. When the as-synthesized powder is subject to oven or furnace heating it can be heated in an open crucible. Preferred is an electrical resistance furnace.

It has been found satisfactory to heat the first reference composition gradually to the desired final temperature. It has been found satisfactory to place the specimen to be heated into a furnace at room temperature, and then to heat to the desired end-point at a rate of 2-10 C.°/minute, preferably 4-6 C.°/min.

Heating is effected in the presence of oxygen. There are many potential sources for the oxygen. Heating can be effected in the air, or in an oxygen atmosphere. It is also possible for oxygen to be devolved from species employed or derived from the synthesis environment such as nitrates or hydoxyls. It is believed that even small amounts of oxygen contamination can be sufficient to effect the process.

It was found that the particles of starting material will undergo some degree of sintering or agglomeration during heating, particularly at the higher temperatures in the temperature range. Depending upon the particular exigencies of the end use intended, it can be desirable to subject the product of the process to a means for comminution to smaller size. So called media milling is one such method for reducing and/or homogenizing the particle size. Numerous other methods are known in the art.

Each $Eu^{+3}$-doped alkaline earth fluoride composition prepared according to the process of the invention exhibits a unique luminescence spectrum seen neither in the low-temperature synthesized first reference composition nor in melt-crystallized or high temperature-annealed compositions represented by the second reference composition. The luminescence spectra of the compositions are characterized by a range of luminescence peak intensity ratios that have never before been seen.

The $Eu^{+3}$-doped alkaline earth fluoride can be combined with other ingredients to form compositions suitable for use as coatings or inks. In one embodiment, the $Eu^{+3}$-doped alkaline earth fluoride is incorporated into an ink composition suitable for printing. In one embodiment $Eu_x^{+3}Ca_{1-x}F_{2+x-2y}O_y$, wherein $0.002 \leq x \leq 0.20$ and $0 \leq y \leq x$ of the invention is placed in aqueous dispersion, and is combined into an ink suitable for use in printing. In another embodiment, $Eu_x^{+3}Ca_{1-x}F_{2+x-2y}O_y$ is incorporated into a paint composition to form a composition suitable for paints which can be applied by any method known in the art including by brushing, rolling, or spraying.

It is envisioned that other rare-earth elements may also be incorporated into the composition.

Numerous chemical formulations are known in the art for preparing inks, paints, and other coating compositions. Every such composition in the art that contains inorganic pigments in particulate form can be employed to chemical formulate an ink, paint, or other coating composition with the composition of the invention serving as the pigment. The composition of the present invention may serve as the only pigment, or it may be combined with other pigments and particulate matter such as is known in the art of inks and coatings. In one chemical formulation, a $Eu^{+3}$-doped calcium, strontium or barium fluoride is incorporated into an ink or coating with no other pigment, thereby resulting in a luminescent coating that after application to the surface of an article is largely invisible to the eye until subject to UV excitation of luminescence.

The invention is further described in the following specific embodiments, but is not limited thereto.

EXAMPLES

Luminescence Spectra

The luminescence spectra in the examples below were determined using a Jobin-Yvon Spex Fluorolog spectrofluorometer. A 450 W Xe lamp was used as the excitation source. Gratings blazed at 330 nm with 1200 grooves/mm were used in the excitation monochromator. Gratings blazed at 500 nm with 1200 grooves/mm were used in the emission monochromator. A dry powder sample was loaded into a 15 mm long by 5 mm diameter quartz tube. The powder was tamped down to provide a smooth sample surface and the ends of the tube were sealed either with epoxy or cotton plugs. The sample tube was then loaded in a sample holder designed to hold these small tubes. Sample luminescence was measured from the front face of the tube, with an angle of 150 between the excitation and emission beams. A 400 nm low-pass filter was used to prevent the primary excitation beam in second or higher order of the emission monochromator from interfering with the results. Excitation and emission spectrometer bandwidths were 1 nm; spectrum step size was 1 nm; integration time was 0.1 second per data point. Data was corrected for the excitation Xe lamp intensity.

The excitation wavelength was 394 nm. All luminescence data was obtained at room temperature. The ratios of luminescence peaks at 592±2 nm and 627±2 nm were determined.

Reference Composition Examples A, B, C and Examples 1-8

Synthesis

In the amounts shown in Table 1, $Ca(NO_3)_2 \cdot 4H_2O$ (Alfa Aesar, 99.98%) and $Eu(NO_3)_3 \cdot 5H_2O$ (Sigma-Aldrich, 99.9%) were stirred into 250 ml of deionized water in a polycarbonate Erlenmeyer flask. Separately, $NH_4F$ (Alfa Aesar, ASC reagent 99%) was dissolved in the amounts shown in Table 1 by stirring into a further 250 ml aliquot of deionized water. Both solutions as prepared were stirred for about 5 minutes to ensure dissolution of the solids.

The prepared solutions were simultaneously but separately fed by a peristaltic pump at 10 ml/min through silicone rubber tubing into the two arms of a plastic T. Teflon® tubing ran from the leg or output branch of the T into the product flask. A precipitate formed within the output branch of the T immediately beyond the point at which the two streams merged, forming a suspension in the water. The suspension formed was discharged into the product flask. During the discharge the flask containing the product suspension was stirred by magnetic stirring. After discharge was complete, the suspension was held static for about 24 hrs at ambient temperature. The resulting suspension was then centrifuged (Sorvall RC5C, Thermo Electron Corp.) at a relative centrifugal force of 9500×g for 40 min, and the supernatant (containing soluble salts) decanted and discarded. The residue was redispersed in a fresh aliquot of about 400 ml of deionized water using ultrasonic agitation (Sonics and Materials, Inc, Danbury, Conn.) at 50 W/cm². The resulting dispersion was again centrifuged and the supernatant again decanted and discarded. The residue was redispersed as before, and the resulting suspension was dried in a laboratory drying oven at 60° C. in air for 24 hrs to form a dry powder.

Heating

Each batch of dried powder was then divided by visual estimation into five or six equal aliquots. Separate aliquots were heated under the conditions shown in Table 2. Each powder aliquot was placed in a covered alumina crucible which in turn was placed into a Fisher Isotemp Programmable Ashing Furnace, Model 497, at room temperature. The specimen was then heated in air at a programmed rate of 5° C./min to the maximum temperature indicated in Table 2, then held isothermally for 1 hr, followed by cooling at 5 C.°/min to room temperature.

Results

The luminescence spectra of the samples so prepared were taken, ratio of the luminescence peak intensity at 627±2 nm to that at 592±2 nm was determined for each sample. The results are shown in Table 2.

TABLE 1

| Example | $Ca(NO_3)_2 \cdot 4H_2O$ (g) | $Eu(NO_3)_3 \cdot 5H_2O$ (g) | $NH_4F$ (g) |
|---|---|---|---|
| Examples 1 and 2 Reference Composition Ex. A | 23.143 | 0.856 | 7.482 |
| Examples 3 and 4 Reference Composition Ex. B | 22.434 | 2.140 | 7.593 |
| Examples 5 and 6 Reference Composition Ex. C | 21.254 | 4.281 | 7.778 |
| Examples 7 and 8 Reference Composition Ex. D | 23.568 | 0.086 | 7.415 |

TABLE 2

| Example | Maximum Temp (° C.) | Hold Time (min) | Peak Intensity Ratio (627 nm/592 nm) |
|---|---|---|---|
| Reference Composition Ex. A | 25 | N/A* | 0.108 |
| Example 1 | 500 | 60 | 0.140 |
| Example 2 | 900 | 60 | 0.485 |
| Reference Composition Ex. B | 25 | N/A* | 0.144 |
| Example 3 | 500 | 60 | 0.177 |
| Example 4 | 900 | 60 | 0.520 |
| Reference Composition Ex. C | 25 | N/A* | 0.188 |
| Example 5 | 500 | 60 | 0.225 |
| Example 6 | 900 | 60 | 0.770 |
| Reference Composition Ex. D | 25 | N/A* | 0.062 |
| Example 7 | 500 | 60 | 0.115 |
| Example 8 | 900 | 60 | 1.164 |
| Reference Composition Ex. E | 900 | 360 | 2.0100 |

N/A = Not applicable

Reference Composition Example E

A further aliquot of the dry powder of Reference Composition Example A was subject to heating in the manner of Examples 1-6. However, the specimen was heated to 900° C. and held for 6 hours isothermally, then cooled at 5 C.°/min to room temperature. Results are shown in Table 2.

Example 9 and Reference Composition Example F

Following the procedures of Example 1-6, 7.328 g of $EuCl_3 \cdot 6H_2O$ was combined with 21.330 g of $SrCl_2 \cdot 6H_2O$ in 250 ml of filtered deionized water followed by combination with a solution of 8.149 g of $NH_4F$ in a further 250 ml of water. The product was separated, washed and dried as in Examples 1-6. Following isolation of the product, it was divided into two approximately equal aliquots, the A sample was retained as the reference composition (Reference Composition Example F) and the B sample was subject to heating to 900° C. at a rate of 5 C.°/min, and held at 900° C. for 1 hour followed by cooling (Example 9).

Luminescence of the two samples thereby resulting was determined in the manner described above and the 592/627 nm peak intensity ratio determined. Results are shown in Table 3.

TABLE 3

| | Peak Intensity Ratio |
|---|---|
| Comp. Ex. F | 4.74 |
| Example 9 | 2.23 |

Example 10 and Reference Composition Example G

EuBaF2

23.937 g of BaCl$_2$.2H$_2$O (Sigma-Aldrich, 99.9%) and 0.733 g of EuCl$_3$.6H$_2$O (Sigma-Aldrich, 99.9%) were stirred into 250 ml of deionized water in a polycarbonate Erlenmeyer flask. Separately, 7.482 g of NH$_4$F (Alfa Aesar, ASC reagent 99%) was dissolved by stirring into a further 250 ml aliquot of deionized water. Both solutions prepared were stirred for about 5 minutes to ensure dissolution of the solids.

The prepared solutions were combined, purified, and dried according to the procedures of Examples 1-6. Following isolation of the product, it was divided into two approximately equal aliquots, the A sample was retained as the reference composition (Reference Composition Example G) and the B sample was subject to heating in air to 900° C. at a rate of 5 C.°/min, and held at 900° C. for 1 hour followed by cooling (Example 10).

Luminescence of the two samples thereby resulting was determined in the manner described above and the 592/698 nm peak intensity ratio determined. Results are shown in Table 4.

TABLE 4

| | Peak Intensity Ratio |
|---|---|
| Comp. Ex. G | 0.473 |
| Example 10 | 0.272 |

What is claimed is:

1. A composition represented by the chemical formula $$Eu_xA_{1-x}F_{2+x-2y}O_y$$

wherein A is alkaline earth, $0.002 \leq x \leq 0.20$, and $0 \leq y \leq x$; the composition exhibiting a luminescence spectrum characterized by peaks at 592±2 nm and 627±2 nm, wherein the ratio of the peak intensity at 592±2 nm to that at 627±2 nm is at least 5% larger than the corresponding peak intensity ratio at the same wavelengths of a first corresponding reference composition with the same value of x that has not been exposed to a temperature above 100° C., and wherein said ratio of the peak intensity at 592±2 nm to that at 627±2 nm is at least 5% smaller than the corresponding peak intensity ratio at the same wavelengths of a second corresponding reference composition with the same value of x that has been subject to heating to 900° C. for 6 hours.

2. The composition of claim 1 wherein A is selected from Ca$^{+2}$, Ba$^{+2}$, or Sr$^{+2}$.

3. The composition of claim 2 wherein A is Ca$^{+2}$.

4. The composition of claim 2 wherein A is Sr$^{+2}$.

5. The composition of claim 1 wherein $0.01 \leq x \leq 0.10$.

6. A process comprising heating in the presence of oxygen a composition represented by the chemical formula $$Eu_x^{+3}A_{1-x}F_{2+x-2y}O_y$$

wherein A is alkaline earth, $0.002 \leq x \leq 0.20$, and $0 \leq y \leq x$; initially prepared at a temperature below 100° C., to a maximum temperature in the range of 200° C. to 900° C., followed by cooling to ambient temperature; with the proviso that the duration of heating not exceed six hours at 900° C., and with the further proviso that the composition so heated has not previously been exposed to the maximum temperature.

7. The process of claim 6 wherein A is selected from Ca$^{+2}$, Ba$^{+2}$, or Sr$^{+2}$.

8. The process of claim 7 wherein A is Ca$^{+2}$.

9. The process of claim 7 wherein A is Sr$^{+2}$.

10. The process of claim 6 wherein $0.01 \leq x \leq 0.10$.

11. The process of claim 6 wherein the heating is effected in a series of steps.

* * * * *